United States Patent
Kaes et al.

(10) Patent No.: US 8,272,497 B2
(45) Date of Patent: Sep. 25, 2012

(54) APPARATUS FOR CONVEYING PACKAGES

(75) Inventors: Roland Kaes, Moosham (DE); Walter Oberpriller, Beratshausen/Oberpfraundorf (DE)

(73) Assignee: Krones AG (DE)

( * ) Notice: Subject to any disclaimer, the term of this patent is extended or adjusted under 35 U.S.C. 154(b) by 0 days.

(21) Appl. No.: 12/532,991

(22) PCT Filed: Jul. 29, 2008

(86) PCT No.: PCT/EP2008/059912
§ 371 (c)(1), (2), (4) Date: Dec. 18, 2009

(87) PCT Pub. No.: WO2009/019164
PCT Pub. Date: Feb. 12, 2009

(65) Prior Publication Data
US 2010/0147650 A1 Jun. 17, 2010

(30) Foreign Application Priority Data
Aug. 7, 2007 (DE) .................... 10 2007 037 250

(51) Int. Cl.
*B65G 29/00* (2006.01)
(52) U.S. Cl. .................. 198/377.06; 198/374; 198/376; 198/377.07
(58) Field of Classification Search ............... 198/374, 198/375, 376, 377.03, 377.06, 377.07, 377.1, 198/400, 401
See application file for complete search history.

(56) References Cited

U.S. PATENT DOCUMENTS

| | | | | |
|---|---|---|---|---|
| 4,024,965 A * | 5/1977 | Marth et al. | ................... | 198/374 |
| 4,483,526 A * | 11/1984 | Bulka et al. | ............... | 198/377.07 |
| 4,606,452 A | 8/1986 | Lecrone | .................. | 198/411 |
| 5,038,913 A | 8/1991 | Kramer | ................... | 198/377 |
| 5,090,553 A | 2/1992 | Focke | ..................... | 198/377 |
| 5,370,216 A * | 12/1994 | Tsuruyama et al. | .......... | 198/401 |
| 6,151,867 A * | 11/2000 | Focke et al. | .............. | 198/377.04 |
| 6,520,314 B1 * | 2/2003 | Seiling | ....................... | 198/375 |
| 7,000,755 B2 * | 2/2006 | van Pinxteren et al. | ....... | 198/374 |
| 2008/0304950 A1 | 12/2008 | Persson | .................... | 414/757 |

FOREIGN PATENT DOCUMENTS

| | | |
|---|---|---|
| DE | 35 26 659 | 5/1987 |
| DE | 36 03 297 | 6/1987 |
| DE | 39 07 566 | 8/1990 |
| DE | 39 15 246 | 11/1990 |
| DE | 42 37 526 | 3/1993 |
| DE | 42 06 467 | 9/1993 |

(Continued)

OTHER PUBLICATIONS

Chinese Office Action, dated Jan. 9, 2012 (10 pgs). European Office Action, dated Jan. 26, 2012 (4 pgs).

*Primary Examiner* — James R Bidwell
(74) *Attorney, Agent, or Firm* — Hayes Soloway P.C.

(57) ABSTRACT

An apparatus (1) for conveying packages (10), comprising a first conveying device (4) which conveys the packages (10) in a predefined conveying direction (r), and a rotating device (6) which rotates at least some of the packages (10) by a predefined angle of rotation with respect to a predefined axis of rotation, wherein the rotating device (6) comprises at least one gripping device (12) which grips the packages (10) for the rotation process. According to the invention, the conveying speed of the first conveying device (4) is synchronised with a movement speed of the gripping device (12).

21 Claims, 2 Drawing Sheets

FOREIGN PATENT DOCUMENTS

| | | |
|---|---|---|
| DE | 44 02 491 | 3/1994 |
| DE | 195 15 199 | 10/1998 |
| DE | 197 53 019 | 2/1999 |
| DE | 60 2004 008 800 | 1/2008 |
| EP | 1 046 598 | 10/2000 |
| EP | 1 693 300 | 7/2006 |
| EP | 1 767 474 | 9/2006 |
| GB | 2 177 991 | 4/1987 |

* cited by examiner

APPARATUS FOR CONVEYING PACKAGES

FIELD OF THE INVENTION

The present invention relates to an apparatus for conveying packages. In the packaging industry, it is customary to combine for example a plurality of containers to form packages and then to palletise a plurality of such packages in a plurality of layers. In order to be able to stack such a plurality of different layers one above the other, it is customary to arrange the individual packages, which have for example a rectangular cross section, in a manner offset relative to one another so as in this way to avoid the occurrence of gaps which extend through the entire height of a stack.

BACKGROUND OF THE INVENTION

A packaging installation is known from EP 1 693 300 A1. This packaging installation comprises a plurality of functional units such as, for example, shrink-wrap tunnels, cooling sections or grouping devices.

Increasingly high operating speeds are being demanded in the production of such packages. When producing such layers of packages, it is sometimes necessary to rotate individual packages relative to a conveying path. For this purpose, use is made for example of rotating devices which act on the package at a certain point and in this way bring about a rotation of the package. However, such installations are limited with regard to their conveying speed and thus also their packaging speed.

An object of the present invention is therefore to provide an apparatus for conveying packages which permits a higher operating speed.

SUMMARY OF THE INVENTION

An apparatus according to the invention for conveying packages comprises a first conveying device which conveys the packages in a predefined conveying direction. Also provided is a rotating device which rotates at least some of the packages by a predefined angle of rotation with respect to a predefined axis of rotation. Here, this rotating device comprises at least one gripping device which grips the packages for the rotation process, wherein the gripping device can move in the conveying direction. According to the invention, the conveying speed of the first conveying device is synchronised with a movement speed of the gripping device.

The rotating device rotates the packages preferably relative to the conveying device, which is for example a conveyor belt. A gripping device is understood to be an element which makes contact with the package to be gripped on at least one side face, but preferably on at least two side faces. By synchronising the conveying speed with the movement speed of the gripping device, it is possible to increase the conveying speed overall. More specifically, the rotating device carries out a precisely defined rotation, for example a rotation of the package through 90°, and is also moved at least in the conveying direction while carrying out this rotational movement, wherein in particular this movement in the conveying direction is at least temporarily synchronised with the conveying speed of the conveying device in the conveying direction.

More specifically, the gripping device moves at least at times in the conveying direction and during this time period in particular also above the conveying device, wherein the movement speed of the gripping device in the conveying direction corresponds during this time period to the conveying speed of the conveying device.

Preferably a plurality of gripping devices are provided, wherein these gripping devices are moved at least at times in the conveying direction. In a further advantageous embodiment, the gripping devices are also moved at least at times in a direction perpendicular to the conveying direction and particularly preferably in a direction perpendicular to the plane of the conveyor belt. Advantageously, the gripping devices are moved along a circular path. Preferably, the gripping device is or a plurality of gripping devices are arranged such that it/they can rotate about a predefined axis. This is in particular an axis which is arranged above the conveying device, wherein this axis is particularly preferably likewise perpendicular to the conveying direction. In one advantageous embodiment, a plurality of gripping devices are arranged such that they can rotate about this aforementioned predefined axis.

Preferably, the gripping device is configured in such a way that it grips the package essentially with a form fit. Here, for example, two plates located opposite one another may be provided as gripping elements which are spaced apart from one another by a distance that is slightly larger than the longitudinal direction of the package (or larger than the transverse direction if the package is gripped along its longitudinal direction). In this way, the package can be rotated very precisely and with a high degree of angle accuracy by the gripping device. Preferably a plurality of gripping devices are provided which can rotate about the abovementioned predefined axis, wherein, in order to bring about the rotation of the packages, each individual gripping device can additionally rotate about a further axis which is not parallel to the abovementioned predefined axis and is preferably perpendicular thereto.

The further axis, about which the individual gripping devices can rotate, is preferably arranged between the two plates. Preferably arranged upstream of the rotating device in the conveying direction is a sensor device, such as a light barrier, which detects the presence of a package. In this case, account must be taken of the fact that the packages sometimes do not arrive on the conveying device at regular time intervals, but rather irregularly. Also provided is a control device which, in reaction to a signal from the sensor device, initiates the package rotation process and synchronises the speed of the gripping devices with the speed of the conveying device.

The present invention also relates to an installation for conveying packages, comprising an apparatus of the type described above, wherein this installation has upstream of the rotating device in the conveying direction a conveyor belt which generates predefined distances between individual packages. A conveying direction is understood here to mean that direction along which the packages are conveyed. Here, the individual packages usually arrive without distances between them. The conveyor belt generates distances between the individual packages which in turn enable a gripping of the packages by the gripping devices.

In a further advantageous embodiment, the installation comprises a pushing device which pushes a plurality of packages in a direction differing from the conveying direction. For example, a plurality of groups or rows of packages are formed, wherein within these groups or rows some packages are rotated and others are not. The pushing device pushes these individual rows back together in a different direction, so as in this way to allow palletisation. The different direction is preferably essentially perpendicular to the conveying direction.

Preferably provided downstream of the first conveying device in the conveying direction is a further conveying device which conveys the packages after or downstream of the first conveying device. Here, this further conveying device preferably conveys the packages in the conveying direction. Advantageously, therefore, a slowing device or preliminary path is provided between the pushing device and the first conveying device. Preferably this is a preliminary path which serves to slow down the speed brought about during the rotation process. The slowing device likewise moves the packages in the conveying direction.

This downstream preliminary path is intended to slow or reduce the high speed of the rotation process. In the case of a low overall power or overall conveying speed of the installation, it is also possible to omit the aforementioned preliminary path.

Furthermore, there is preferably provided after the preliminary path the further conveying device for the packages, which is also referred to as the run-in path and can be moved relative to the displacement device. On this run-in path, preferably a speed control is provided which allows a positioning of the packages in a manner dependent on the layer pattern. This run-in path is preferably not synchronised with the first conveying device, but rather the rotation process (serving to prepare the layers) and the row preparation are decoupled from one another by the run-in path. If, for example, a fault occurs on the run-in path or the grouping belt, the layer preparation can be stopped and the process can be separated by the abovementioned preliminary path. The gaps produced between the individual packages before the rotation process are preferably at least partially closed again by the abovementioned preliminary path.

In a further advantageous embodiment, provided on the conveying device upstream of the rotating device is a further displacement device which displaces individual packages in a direction differing from the conveying direction. This further displacement device preferably displaces individual packages perpendicular to the conveying direction. In this way it is possible to arrange the packages in two lanes located next to one another. With particular preference, however, just one rotating device is provided which rotates the packages on just one of these lanes. With particular advantage, the packages displaced by the further displacement device are not rotated, so that one group or row with non-rotated packages is obtained. In this way, the speed of the installation as a whole can be increased, since for example a row containing non-rotated packages can be combined together with a further row containing packages that have in some cases been rotated.

Preferably, the conveying device is configured in such a way that two packages can be conveyed next to one another in a direction perpendicular to the conveying direction. An increase in throughput is also possible in this way. In a further advantageous embodiment, the installation has at least two rotating devices arranged next to one another in a direction perpendicular to the conveying direction. In this case, the rotational movements carried out by these rotating devices are preferably controlled by a control device, so that the packages can be arranged in a desired sequence relative to one another. It would also be possible to provide more than two rotating devices next to one another. If, for example, a layer of packages is composed of n rows of packages, up to n rotating devices could be provided. In one preferred embodiment, it would also be possible to provide n/2 rotating devices in order to create n rows of packages.

The present invention also relates to a method for conveying packages, wherein the packages or individual packages are conveyed in a predefined conveying direction by means of a first conveying device and are rotated about a predefined axis of rotation by means of a rotating device, wherein the packages are rotated during conveying by the first conveying device. According to the invention, the packages are gripped by means of moving gripping devices in order to carry out the rotation process, wherein the movements of these gripping devices are synchronised with the movement of the conveying device. The axis of rotation, about which the packages are rotated, advantageously runs perpendicular to the conveying device and particularly preferably within the packages. Ideally, the axis of rotation runs through the centre of gravity of the individual package. In this way, a very quick rotation of the package is possible without imbalances occurring.

Advantageously, the packages are gripped by the gripping device essentially with a form fit. In this way, as mentioned above, a very precise rotation of the individual packages is possible even at a high conveying speed.

Further advantageous embodiments will emerge from the appended drawings:

DETAILED DESCRIPTION

Figure 1:
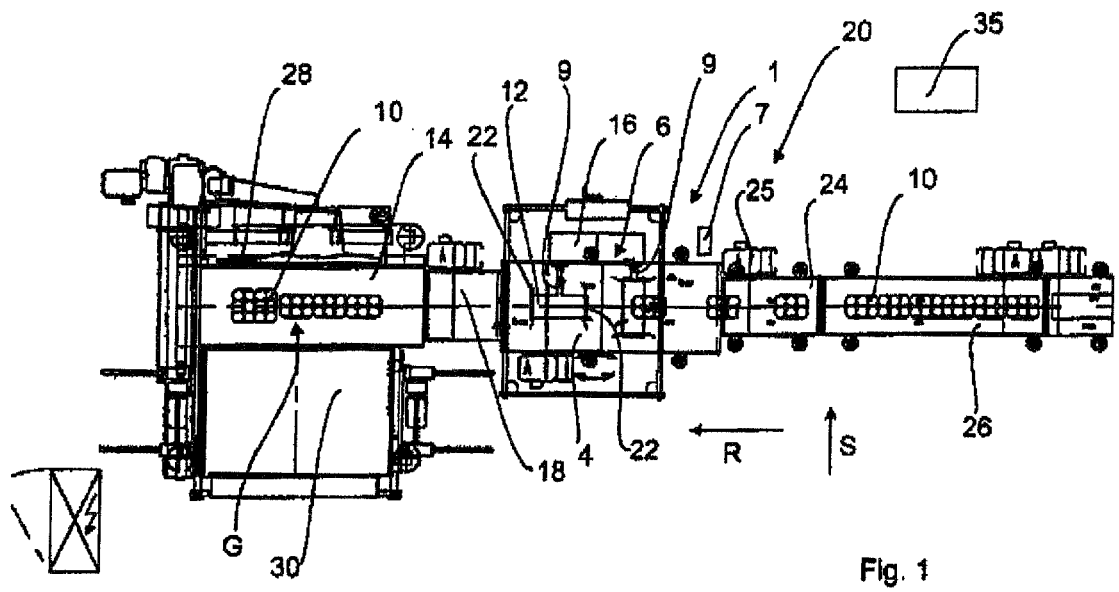
FIG. 1 shows an installation according to the invention for conveying packages in a first embodiment.

FIG. 1 shows an installation 20 according to the invention for conveying packages in a first embodiment. The packages 10, which may be for example batches comprising a plurality of bottles, are supplied here via a conveyor belt 26, which may be for example a stop-start belt. There may be arranged upstream of this stop-start belt 26 for example a control section and/or a shrink-wrap tunnel (not shown) which produces the packages 10 from a plurality of individual containers.

This stop-start belt 26 is adjoined by a separating belt 24 which generates gaps between individual packages 10, this being helpful for carrying out the rotation process that is to be described below. The separating belt 24 is adjoined by a first conveying device 4 which, as will be explained in more detail below, serves to bring about the rotation process for the packages 10. Reference 1 denotes in its entirety the apparatus according to the invention for conveying packages 10.

In other embodiments, it would also be possible to omit the separating belt 24 and to arrange the conveying device directly downstream of the stop-start belt 26. Reference 25 denotes a drive for the separating belt 24.

The stop-start belt 26 preferably runs at a lower speed than the separating belt. By way of example, the speed of the stop-start belt may be between 0.1 m/sec and 0.3 m/sec and preferably may be 0.2 m/sec, and the speed of the separating belt may be between 0.4 m/sec and 0.8 m/sec and preferably may be 0.6 m/sec, in order in this way to produce the necessary gaps. In this embodiment, the conveying device 4 is a single-lane flat-top chain conveyor which advantageously runs even faster than the separating belt, for example at a speed of approximately 1.0 m/sec. In the embodiment shown in FIG. 1, therefore, the separating belt 24 also serves to accelerate the packages.

Reference 6 denotes in its entirety a rotating device, by means of which individual packages are rotated by a predefined angle, in particular by 90°. One such rotated package is shown in the left-hand part of FIG. 1. In this case, rotations in the clockwise direction and in the anticlockwise direction are possible, and also rotations through 180°, for the alignment of labels for example.

The rotating device 6 comprises a plurality of gripping devices 12 which are arranged such that they can rotate about shafts 9, wherein these shafts 9 extend in the direction S in FIG. 1 and are arranged above the conveying device 4. Reference 16 denotes a drive which brings about the rotational movement of the gripping devices 12 about the shaft 9 arranged above the conveying device 4. Preferably a plurality of these shafts 9 are in turn arranged such that they can rotate about a central shaft (not shown). In this case, this central shaft advantageously runs parallel to the individual shafts 9.

The rotation of these shafts 9 about the central shaft may take place at a constant angular speed, but it would also be possible that this rotational movement is adapted so that the individual gripping devices 12 move essentially at the conveying speed of the first conveying device 4 over a distance that is as long as possible. To this end, for example, it would be conceivable to make the rotational speed dependent also on the rotary position of the individual gripping devices 12 relative to the central shaft. In mathematical terms, this would be able to be carried out for example by using trigonometric functions to describe the relationship between the conveying speed of the conveying device 4 and the rotational speed of the individual gripping devices 12 about the central shaft. Preferably, the rotational movement about the central shaft is mechanically coupled to the rotational movements about the shafts 9, so that the rotary position of the gripping device relative to the conveyor belt remains constant.

Reference R denotes the conveying direction in which the packages 10 are conveyed along the installation 20. Reference 22 denotes gripping elements which are provided for gripping the individual packages. In the embodiment shown in FIG. 1, these are two plates 22 which are located opposite one another and which are spaced apart by a distance that is only slightly greater than the length of the package. In this way, the packages are gripped by the gripping elements 22 with a form fit and thus a very precise rotation process is possible. It would also be possible for the two plates to be spaced apart from one another in a basic position by a distance which is greater than the length of the package and furthermore for adjusting elements to be provided which move the plates towards one another and thus bring them into form-fitting contact with the respective package. The plates 22 could also be arranged at an angle in such a way as to facilitate the introduction of the package between two plates 22.

Reference 35 denotes a control device which controls the process of rotating individual packages. It is pointed out here that not all of the packages are rotated but rather, as shown in FIG. 1, only certain packages so as in this way to achieve a precise layer pattern controlled by the control device 35. A row consisting of a plurality of packages is shown on the left-hand side in FIG. 1, wherein the two packages on the left have each been rotated through 90° and the three packages adjoining these on the right have not been rotated.

This package group G is then displaced onto a pallet 30 by a displacement device 28, wherein this displacement takes place in the direction opposite the direction S. A variable layer-dependent rotation is thus ensured with the installation according to the invention.

The speed of the conveying device 4 is adapted to or harmonised with the movement speed of the gripping devices 12 in the movement direction R. In order to harmonise these speeds, use is made of an angle of rotation indicator. Reference 7 denotes a light barrier which is arranged upstream of the rotating device 6 and initiates the rotation process. More specifically, the light barrier unit is provided on the flat-top chain conveyor upstream of the actual rotating device 6.

Reference 18 denotes a preliminary path which is arranged downstream of the rotating device 6 and which serves to slow or reduce the speed of the rotation process and of the conveying device 4.

On the run-in path 14, which can likewise be adjusted with regard to its conveying speed in the conveying direction R, the individual packages 10 are pushed together again and are positioned as a function of the desired layer pattern. This means that specific distances can also be generated in a targeted manner between individual packages 10 on the run-in path. As soon as a certain group G has been brought together, it can be pushed in the direction of the pallet 30 by means of the displacement device 28, which can also be referred to as the row pushing device.

In all the embodiments shown in the figures, therefore, the entire rotation process, i.e. on the one hand the layer preparation and on the other hand the row preparation, which takes place in particular by the rotating device 6, is decoupled by means of the preliminary path. It is thus also possible, in the event of a fault in the grouping belt or run-in path 14, to stop the layer preparation by means of the rotating device 6 and to isolate the process by means of the slowing belt or preliminary belt 18.

Figure 2:
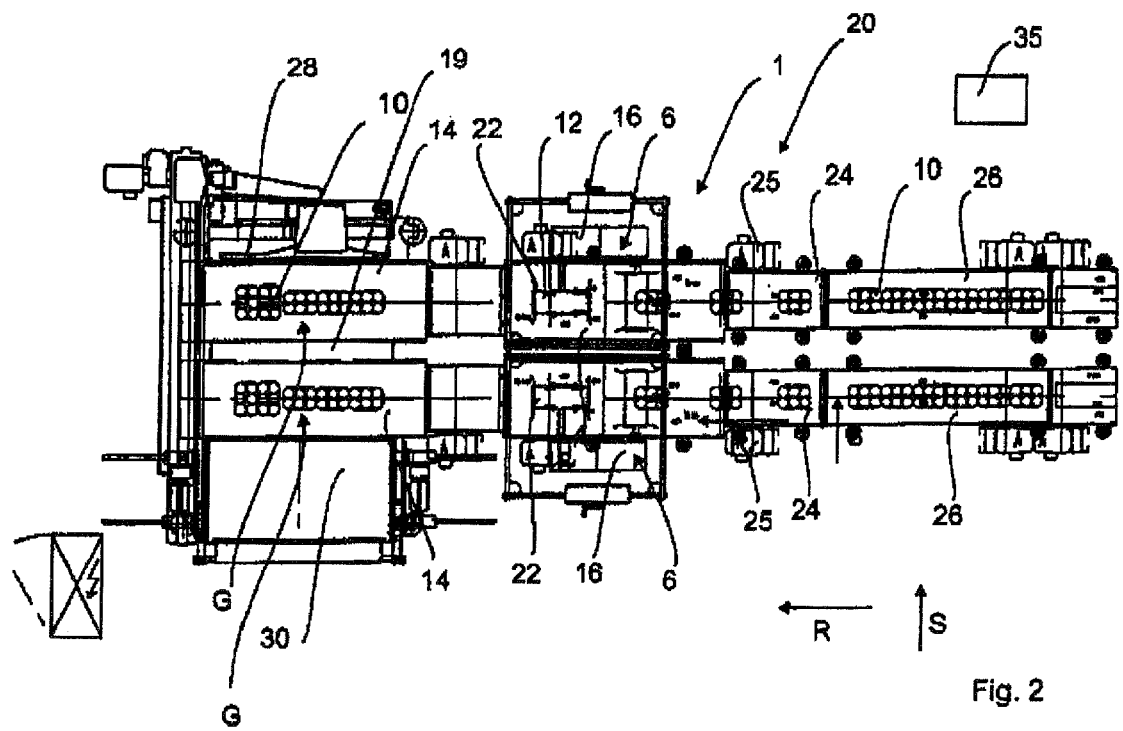
FIG. 2 shows an installation according to the invention for conveying packages in a second embodiment.

FIG. 2 shows a further embodiment of an installation according to the invention. In this embodiment, two rotating devices 6 from FIG. 1 are arranged parallel to one another. As a result, in each case two groups G of packages 10 arranged parallel to one another can be produced, which are then pushed onto the pallet 30 by means of the displacement device 28. It is pointed out that the installation 20 is not limited to an arrangement of two rotating devices 6 parallel to one another, but rather here too a control device 35 means that the two groups G are matched to one another in terms of their respective layer pattern. Although two identically formed groups G are shown in FIG. 2, in practice often the lower group G will differ from the upper group G in terms of the arrangement of the individual packages. It is thus also possible for two differently formed groups G to be generated by the control device 35. The two rotating devices 6 can therefore also be controlled independently of one another. Preferably a transfer plate 19 is provided between the two run-in paths 14, which allows a transfer of the upper group G.

Figure 3:
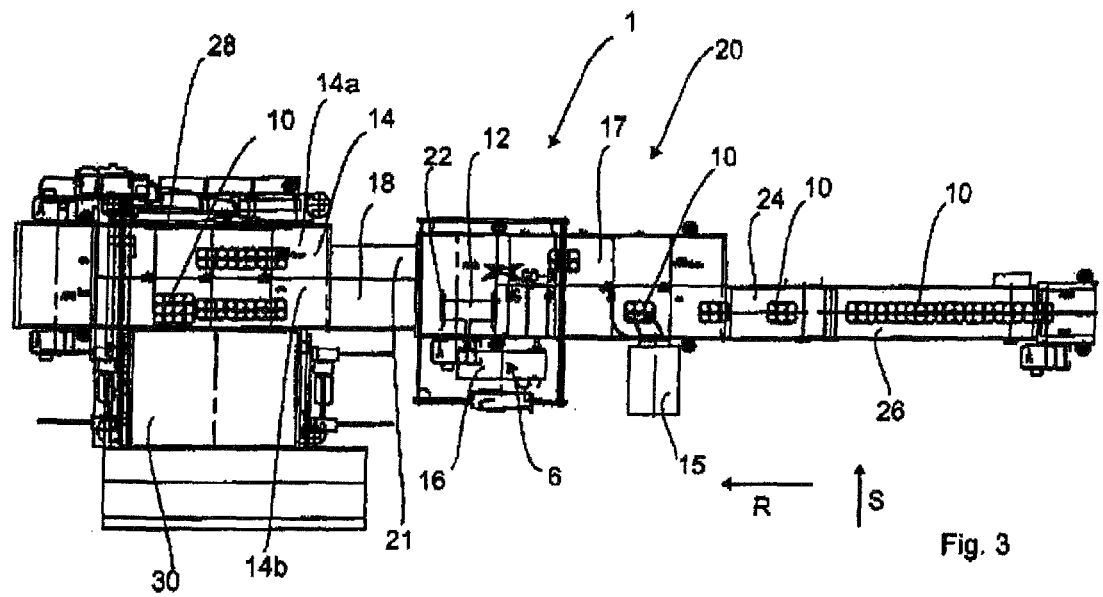
FIG. 3 shows an installation according to the invention for conveying packages in a third embodiment.

FIG. 3 shows a further embodiment of an installation 20 according to the invention. In this embodiment, the packages 10 are once again supplied in just one row and, as described above, are separated from one another via a stop-start belt 26 and a separating belt 24. In the embodiment shown in FIG. 3, however, a transverse displacer 15 is provided which pushes a predefined number of packages 10 upwards in the direction S. It is thus possible for example that each second package 10 is displaced upwards. The rotating device 6 is in this case provided only in the lower row, which adjoins the stop-start belt 26. No rotating device is provided in the upper row, so that the packages displaced into said row are not rotated. It is possible in this case that these two rows are driven or conveyed separately from one another.

In the embodiment shown in FIG. 3, in each case two groups G are produced on the run-in path 14, wherein the upper group in each case contains only packages that have not been rotated. The control device 35 here also adapts these two groups shown in FIG. 3 to one another. It is pointed out that the run-in belt 14 can also be split separately into two sub-belts 14a and 14b, wherein these sub-belts can be controlled differently with regard to their conveying speed. Besides the preliminary path 18, a further preliminary path 21 may also be provided here, which serves for conveying the groups of packages that have not been rotated. Overall, therefore, it is possible to control the compiling of the packages on the run-in path 14 as desired in a manner dependent on the layer pattern. The displacement device 28 pushes in each case two groups G in the direction of the pallet 30, wherein one group contains only packages that have not been rotated.

Figure 4:
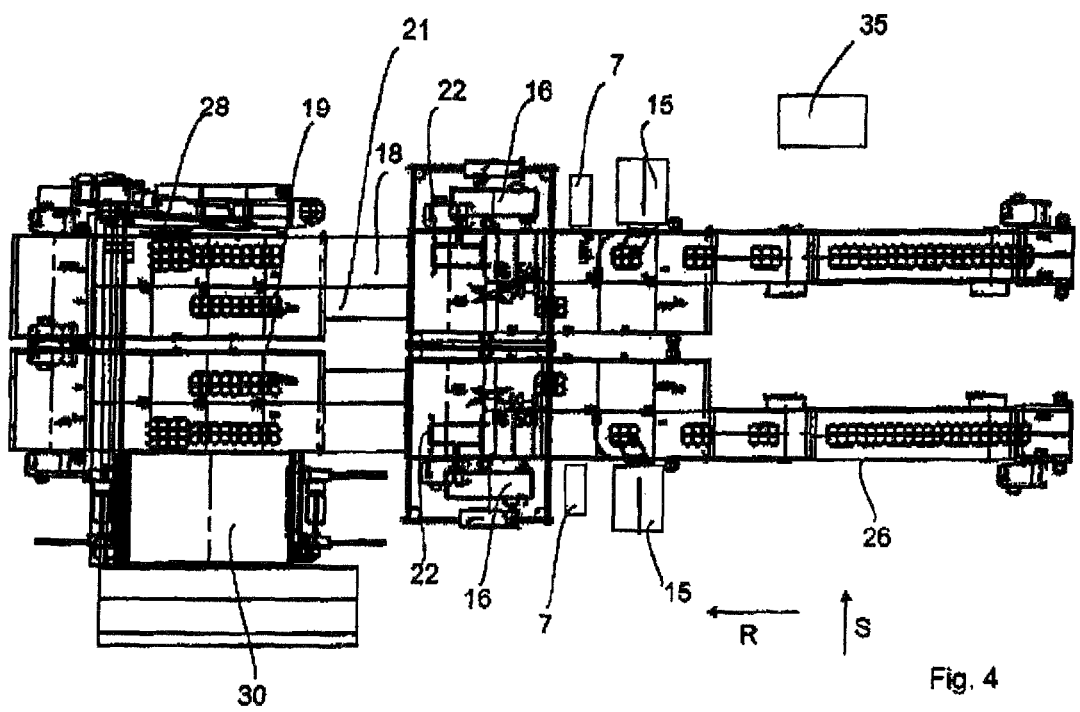
FIG. 4 shows an installation according to the invention for conveying packages in a fourth embodiment.

FIG. 4 shows a further embodiment of an installation 20 according to the invention. This installation 20 contains two modules according to FIG. 3, wherein in each case for space reasons the individual rotating devices 6 are arranged on the outside and the two paths running on the inside thereof displace the packages that have not been rotated. In this embodiment, a total of 4 parallel groups G are displaced in the direction of the pallet 30 by the displacement device 28. Also in this embodiment, once again a transfer plate 19 is provided, over which the packages can be pushed in the direction of the pallet 30. In the embodiment shown in FIG. 4, it would also be possible to provide, instead of the two stop-start belts 26 that are shown, four such stop-start belts, wherein in this way the operating speed of the installation could be increased still further since in this case the packages are supplied in four lanes. If four such stop-start belts 26 are provided, it would also be possible to omit the transverse displacer 15. Similarly, in the embodiment shown in FIG. 3, the packages could also be supplied in two rows and accordingly the transverse displacer 15 could be omitted.

All of the features disclosed in the application documents are claimed as essential to the invention in so far as they are novel individually or in combination with respect to the prior art.

The invention claimed is:

1. An apparatus for conveying packages, comprising:
a first conveying device which conveys the packages in a predefined conveying direction;
a rotating device which rotates at least some of the packages by a predefined angle of rotation with respect to a predefined axis of rotation, the axis being relative to the conveying device; and
a controller which controls the rotation of each package individually,
wherein the rotating device comprises at least one gripping device which grips the packages for rotation, wherein the gripping device can move in the conveying direction above the conveying device, wherein the conveying speed of the first conveying device is synchronized with a movement speed of the gripping device, and wherein arranged upstream of the rotating device in the conveying direction is a sensor device for detecting the presence of a package and a control device, which, in reaction to a signal from the sensor device, initiates the package rotation, and wherein the rotating device carries out a precisely defined rotation and is also moved at least in the conveying direction while carrying out a rotational movement, wherein movement in the conveying direction is at least temporarily synchronized with the conveying speed of the conveying device in the conveying direction.

2. The apparatus according to claim 1, wherein a plurality of gripping devices are provided.

3. The apparatus according to claim 1, wherein the gripping device is moved at least at times in a direction perpendicular to the conveying direction.

4. The apparatus according to claim 1, wherein the gripping device is arranged to rotate about a predefined axis.

5. The apparatus according to claim 1, wherein the gripping device is configured to grip the package essentially with a form fit.

6. An installation for conveying packages, comprising an apparatus for conveying packages according to claim 1, wherein provided upstream of the rotating device in the conveying direction is a conveyor belt for generating predefined distances between individual packages.

7. The installation according to claim 6, wherein the installation comprises a displacement device for pushing a plurality of packages in a direction differing from the conveying direction.

8. The installation according to claim 1, wherein provided downstream of the first conveying device in the conveying direction is a further conveying device for conveying the packages downstream of the first conveying device.

9. The installation according to claim 6, wherein provided between the first conveying device and the further conveying device is a slowing device for slowing the conveying speed of the packages.

10. The installation according to claim 6, wherein provided upstream of the rotating device in the conveying direction is a transverse displacer for displacing individual packages in a direction differing from the conveying direction.

11. The installation according to claim 6, wherein the conveying device is configured to convey two packages next to one another in a direction perpendicular to the conveying direction.

12. The installation according to claim 6, wherein the installation has at least two rotating devices arranged next to one another in a direction perpendicular to the conveying direction.

13. A method for conveying packages, comprising the steps of:
conveying the packages in a predefined conveying direction by a first conveying device;
rotating at least one of the packages about a predefined axis of rotation by a rotating device; and
controlling, by a controller, the rotation of each package individually,
wherein the packages are rotated during conveying by the first conveying device, wherein the packages are gripped by moving gripping devices in order to carry out the rotation process, wherein the movement of these gripping devices is synchronized with the movement of the conveying device, wherein the gripping devices move above the conveyor device during moving in the conveying direction, and wherein arranged upstream of the rotating device in the conveying direction is a sensor device for detecting the presence of a package and a control device, which, in reaction to a signal from the sensor device, initiates the package rotation, and wherein the rotating device carries out a precisely defined rotation and is also moved at least in the conveying direction while carrying out a rotational movement, wherein movement in the conveying direction is at least temporarily synchronized with the conveying speed of the conveying device in the conveying direction.

14. Method according to claim 13, wherein the packages are gripped by the gripping device essentially with a form fit.

15. Method according to claim 13, wherein the axis of rotation, about which the packages are rotated, runs perpendicular to the conveying device and within the packages.

16. The apparatus according to claim 1, wherein the gripping device comprises two plates located opposite one another which are spaced from one another by a distance that is slightly larger than the longitudinal direction of the package or the transverse direction of the package.

17. The apparatus according to claim 1, wherein the axis of rotation runs perpendicular to the conveying device.

18. The apparatus according to claim 1, wherein an angle of rotation indicator is used to harmonize the conveying speed of the first conveying device and the movement speed of the gripping device.

19. The apparatus according to claim 1, wherein the sensor device initiates the rotation process of the rotation device.

20. An apparatus for conveying packages, comprising:
   a first conveying device which conveys the packages in a predefined conveying direction
   a rotating device which rotates at least some of the packages by a predefined angle of rotation with respect to a predefined axis of rotation the axis being relative to the conveying device, and
   a controller which controls the rotation of each package individually,
   wherein the rotating device comprises at least one gripping device which grips the packages for rotation, wherein the gripping device can move in the conveying direction above the conveying device, and wherein the conveying speed of the first conveying device is synchronized with a movement speed of the gripping device, and wherein an angle of rotation indicator is used to harmonize the conveying speed of the first conveying device and the movement speed of the gripping device, and wherein the rotating device carries out a precisely defined rotation and is also moved at least in the conveying direction while carrying out a rotational movement, wherein movement in the conveying direction is at least temporarily synchronized with the conveying speed of the conveying device in the conveying direction.

21. Apparatus according to claim 20, wherein the control device in reaction to a signal from the sensor device synchronizes the speed of the gripping devices with the speed of the conveying device.

* * * * *